United States Patent [19]

Tezuka et al.

[11] Patent Number: 5,002,147
[45] Date of Patent: Mar. 26, 1991

[54] POWER TRANSMITTING SYSTEM FOR A FOUR-WHEEL DRIVE VEHICLE

[75] Inventors: Kazunari Tezuka; Haruo Fujiki, both of Tokyo, Japan

[73] Assignee: Fuji Jukogyo Kabushiki Kaisha, Tokyo, Japan

[21] Appl. No.: 260,984

[22] Filed: Oct. 20, 1988

[30] Foreign Application Priority Data

Oct. 27, 1987 [JP] Japan .................. 62-261002

[51] Int. Cl.⁵ .......................... B60K 23/08
[52] U.S. Cl. ..................... 180/197; 180/248; 364/426.02
[58] Field of Search ............... 180/248, 247, 233, 197, 180/249, 250; 364/424.1, 426.01, 426.02; 303/93

[56] References Cited

U.S. PATENT DOCUMENTS

| | | | |
|---|---|---|---|
| 4,685,547 | 8/1987 | Ohashi et al. | 180/197 |
| 4,709,775 | 12/1987 | Watanabe et al. | 364/424.1 |
| 4,759,590 | 7/1988 | Uchida et al. | 364/426.02 |
| 4,760,893 | 8/1988 | Sigl et al. | 364/426.02 |
| 4,765,691 | 8/1988 | Inoue et al. | 180/197 |
| 4,766,973 | 8/1988 | Kashihara | 180/249 |
| 4,770,266 | 9/1988 | Yamaguchi et al. | 180/197 |
| 4,771,850 | 9/1988 | Matsuda | 180/233 |
| 4,776,421 | 10/1988 | Kashihara | 180/197 |
| 4,840,246 | 6/1989 | Yamakawa et al. | 180/247 |
| 4,849,891 | 7/1989 | Krohn et al. | 180/197 |
| 4,866,625 | 9/1989 | Kawamoto et al. | 364/426.02 |

FOREIGN PATENT DOCUMENTS

55-83617 6/1980 Japan .

Primary Examiner—Charles A. Marmor
Assistant Examiner—A. M. Boehler
Attorney, Agent, or Firm—Martin A. Farber

[57] ABSTRACT

A torque distribution deciding control unit, a planetary gear device as a central differential and an oil hydraulic clutch having opposite disks are provided on a motor vehicle. The clutch is disposed between output members of the planetary gear device, whereby torque is transmitted to front and rear wheels at a distribution ratio decided by clutch torque of the clutch. The control unit operates the clutch so as to distribute the torque at a ratio in accordance with slipping of the front or rear wheels so as to reduce the torque for the slipping wheels.

13 Claims, 8 Drawing Sheets

POWER TRANSMITTING SYSTEM FOR A FOUR-WHEEL DRIVE VEHICLE

BACKGROUND OF THE INVENTION

The present invention relates to a system for transmitting the power of an engine to four wheels of a four-wheel drive vehicle, and more particularly to a system for controlling traction of the vehicle.

In a conventional four-wheel drive vehicle having a central differential, which is called a full time four-wheel drive vehicle, the central differential operates to uniformly split the torque of the engine for the front wheels and rear wheels.

It is known that the distribution ratio of torque influences driveability, steerability, stability, starting characteristic and others. For example, the torque is split in accordance with the distribution of load on the front and rear wheels of the vehicle for good traction. If the torque split is controlled at cornering, a stable cornering characteristic can be obtained. Accordingly, the understeer characteristic encountered in a vehicle driven by front wheels and the oversteer characteristic encountered in a vehicle driven by rear wheels can be restrained. Further, on slippery roads, the distribution of the torque to the rear wheels can be increased so as to ensure safe driving without locking the differential mechanism.

Japanese Patent Laid Open No. 55-83617 discloses such a transmitting system, in which the distribution ratio of torque for the front wheels to rear wheels is controlled by electronically controlling a central differential with a clutch or brake.

However, the system has only a central differential as a means for distributing the torque. Therefore, the distribution ratio is constant. In addition, the system can only select a two-wheel drive mode, four-wheel drive mode or a differential locking mode and is not intended for controlling the distribution ratio of torque.

The applicant of the present invention proposes various electronically controlled torque split systems where the torque distribution ratio to the front and the rear wheels can be changed.

However, although two-wheel slipping can be prevented by controlling the torque distribution ratio, slipping of all of four wheels can not be prevented by the torque split control. In order to restrain the slipping of four wheels, for example, the power of the engine is reduced to decrease the traction.

SUMMARY OF THE INVENTION

The object of the present invention is to provide a system which may control the distribution ratio of torque to the front wheels and rear wheels and traction in accordance with various driving conditions of a four-wheel drive vehicle.

The other objects and features of this invention will become understood from the following description with reference to the accompanying drawings.

DETAILED DESCRIPTION OF THE PREFERRED EMBODIMENT

Figure 1:
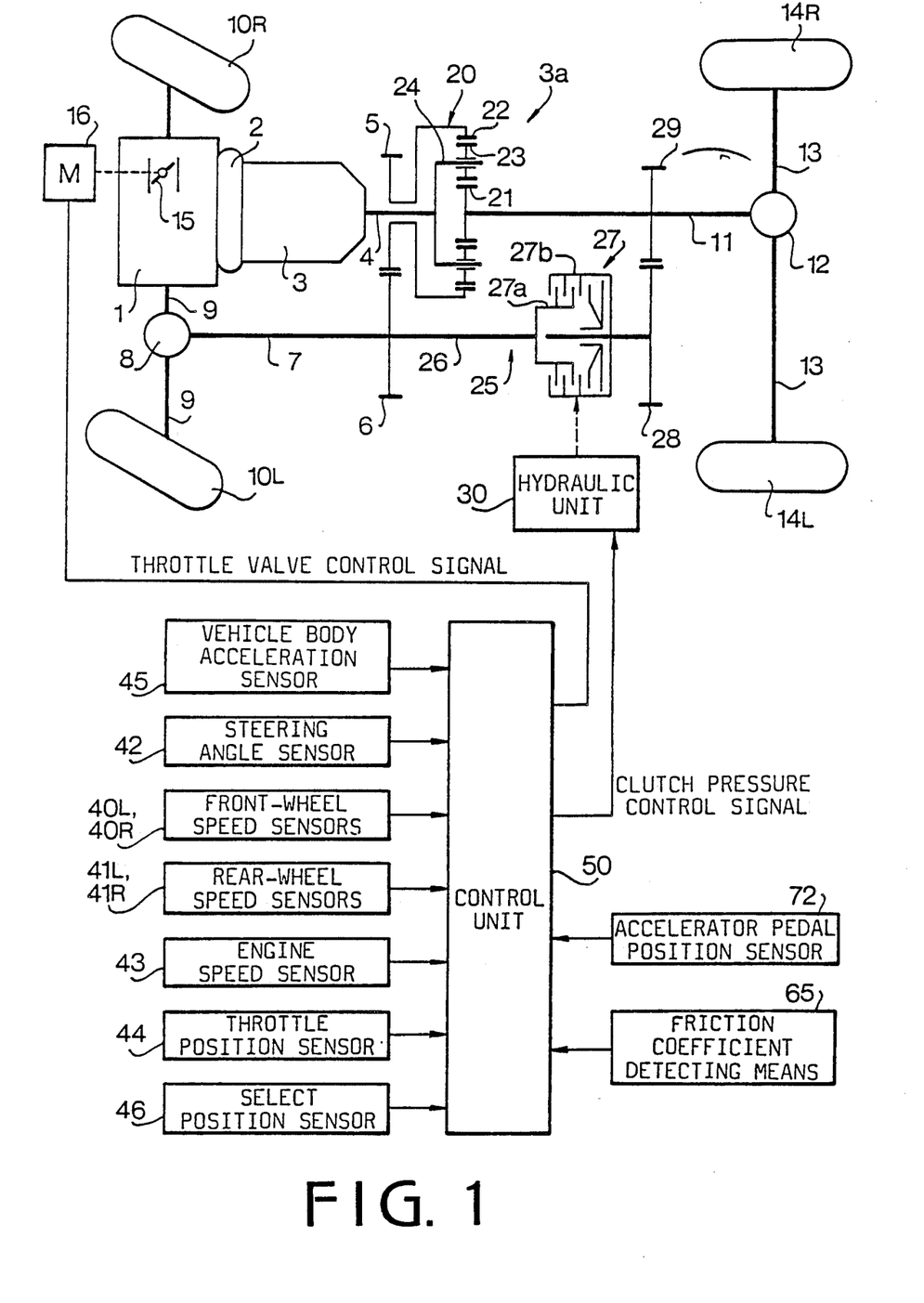
FIG. 1 is a schematic diagram showing a system according to the present invention.

Referring to FIG. 1 showing a power transmission system for a four-wheel drive vehicle, reference numeral 1 designates an engine mounted on a front portion of the vehicle. The power of the engine 1 is transmitted to a transfer device 3a through a torque converter 2 and an automatic transmission 3. In the transfer device 3a, rotation of an output shaft 4 of the transmission 3 is transmitted to a central differential 20. The central differential 20 is a planetary gear device and comprises a sun gear 21, a ring gear 22 having internal teeth, a carrier 24, and planet pinions 23 rotatably supported on the carrier 24 and engaged with both gears 21 and 22. The carrier 24 is connected with the output shaft 4. The ring gear 22 is connected to a gear 5 rotatably mounted on the shaft 4 and in mesh with a gear 6 having the same diameter as the gear 5 and fixedly mounted on a front drive shaft 7. The front drive shaft 7 is operatively connected to a front differential 8 so as to drive front wheels 10R and 10L through axels 9. On the other hand, the sun gear 21 is fixedly mounted on a rear drive shaft 11 so as to drive rear wheels 14R and 14L through a rear differential 12 and axles 13. Thus, the central differential 20 operates to split the torque of the engine at a ratio determined by the gear ratio thereof. The split torque is distributed to the front and rear wheels by the transfer device 3a as described hereinafter. The difference between the speeds of front and rear wheels is absorbed by the central differential.

In the present arrangement of the transmission system, since the static load on the front part of the vehicle is larger than that on rear part, the central differential 20 is adapted to transmit a large torque to the front wheels through the ring gear 22 having a large diameter and to transmit a smaller torque to the rear wheels through the sun gear 21 having a small diameter.

In the system of the present invention, a torque split control device 25 is provided over the central differential 20. The torque split control device 25 includes the gears 5 and 6, a bypass shaft 26 coaxially secured to the front drive shaft 7, a gear 29 secured to the rear drive shaft 11, and a gear 28 in mesh with the gear 29. The gears 28 and 29 are arranged to have a gear ratio which is slightly smaller than 1. The shaft 26 is connected to a hub 27a of an oil hydraulic clutch 27 and gear 28 is secured to a drum 27b of the clutch 27. The clutch has a plurality of disks secured to the hub 27a and drum 27b, respectively.

The clutch 27 is arranged to transmit the torque from a higher speed disk side to a lower speed disk side. When pressurized oil is supplied to the clutch 27 from a hydraulic unit 30, a clutch torque is generated therein, thereby engaging the clutch 27. Since the drum 27b is rotated at a slightly smaller rate than the hub 27a, torque dependent on the clutch torque is transferred from the hub 27a to the drum 27b and to the rear wheels. Thus, torques $T_F$ and $T_R$ transmitted to the front and rear drive shafts 7 and 11 are respectively expressed as follows.

$$T_F = \gamma \cdot T_i - T_C \quad (1)$$

$$T_R = (1-\gamma) \cdot T_i + KT_C \quad (2)$$

where Ti is input torque transmitted to the central differential 20, $\gamma$ is the distribution ratio for the front wheels predetermined by the central differential 20, K is the gear ratio of gears 28, 29, and $T_C$ is the clutch torque.

Accordingly, as the clutch torque $T_c$ increases, the distribution ratio for the front torque $T_F$ becomes smaller than the distribution ratio $\gamma$. On the other hand, the distribution ratio of the rear torque $T_R$ becomes larger than the ratio $(1-\gamma)$. Thus, the torque distribution can be continuously varied.

On a throttle valve 15 of the engine 1, an actuator 16 such as a motor m is attached for electrically actuating the throttle valve.

An electronic control system has left and right front-wheel speed sensors 40L and 40R, left and right rear-wheel speed sensors 41L and 41R, steering angle sensor 42, engine speed sensor 43, throttle position sensor 44, vehicle body acceleration sensor 45 and a select position sensor 46 for determining the selected gear in the automatic transmission 3, an accelerator pedal position sensor 72 and a friction coefficient detecting means 65. The vehicle body acceleration sensor 45 has a ground speed sensor and produces a vehicle body acceleration signal based on the ground speed.

A control unit 50 which is supplied with outputs of the sensors 40 to 46 and 72, and the friction coefficient detecting means 65 produces an output signal which is applied to the hydraulic unit 30 to control oil pressure applied to the oil clutch 27.

The hydraulic unit 30 for the clutch 27 is described hereinafter with reference to FIG. 2a. The hydraulic unit 30 comprises a pressure regulator valve 32, a transfer control valve 36 and a solenoid operated valve 34. The pressure regulator valve 32 is communicated with a passage 31 through which a line pressure of the automatic transmission 3 is supplied. The regulator valve 32 operates to provide a constant pilot pressure in a passage 33 by controlling the oil supplied to the passage 33 and drained therefrom. The passage 33 is communicated with the solenoid operated valve 34 and to an end of the transfer control valve 36 through a passage 35. The transfer control valve 36 is communicated with the passage 31 and with the clutch 27 through a passage 37. The solenoid operated valve 34 is operated by pulses from the control unit 50 at a duty ratio determined therein, thereby controlling the drain of the oil to provide a control pressure $P_C$. The control pressure $P_C$ is applied to an end of a spool 36a of the transfer control valve 36 to control the oil supplied to the clutch 27 so as to control the clutch pressure (torque).

Figures 2A, 2B:
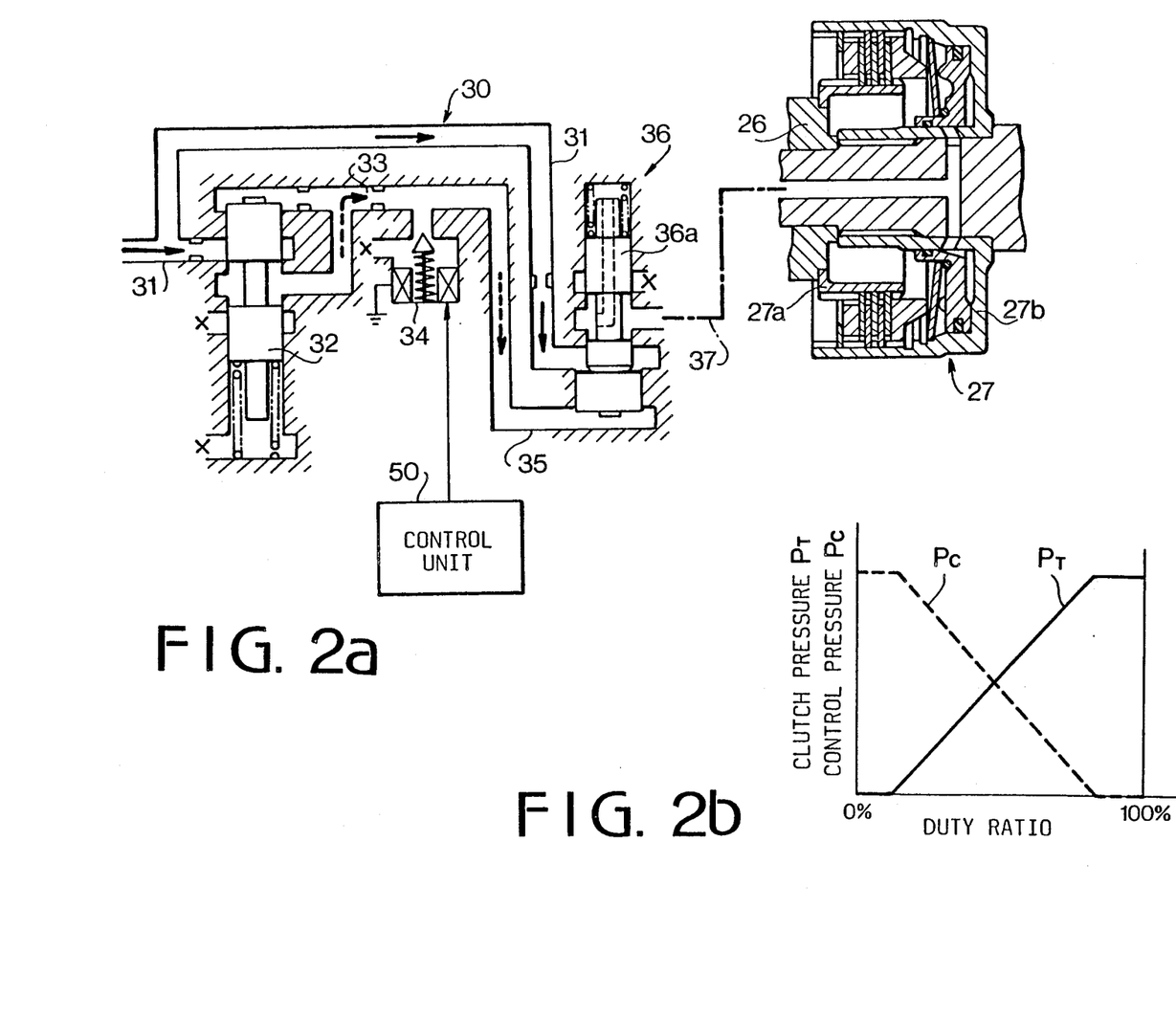
FIG. 2a shows a hydraulic circuit for controlling a hydraulic clutch.
FIG. 2b is a graph showing a characteristic of a clutch pressure.

FIG. 2b shows the relationship between the clutch pressure $P_T$, control pressure $P_C$ and duty ratio. When the duty ratio is at 0%, the solenoid operated valve 34 does not drain the oil. Accordingly the control pressure $P_C$ is at the highest value which is equal to the pilot pressure. As the duty ratio increases, the control pressure $P_C$ reduces as shown by a broken line. On the other hand, the clutch pressure $P_T$ is zero in a small duty ratio range and increases with an increase of the duty ratio.

Figure 3A:
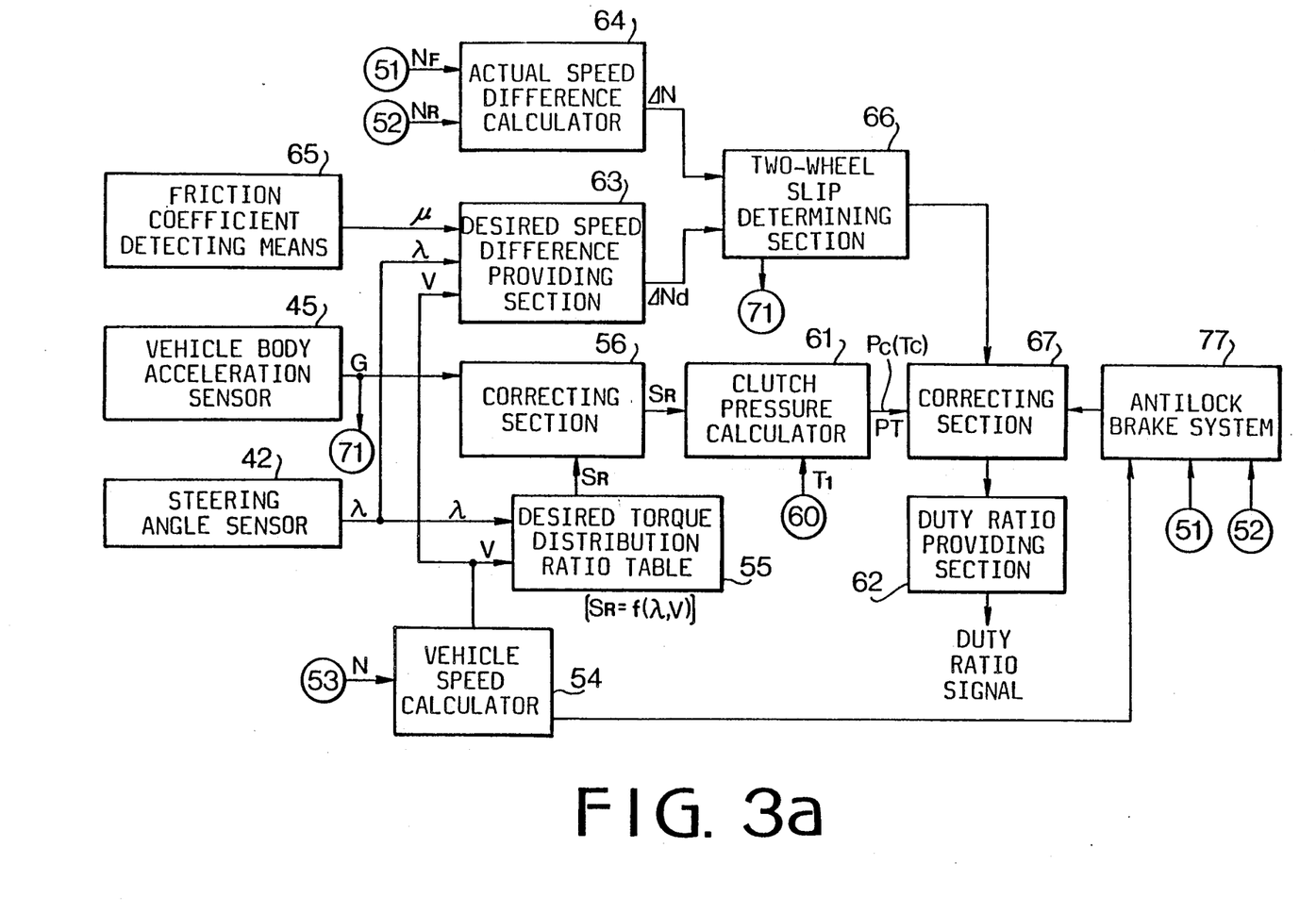
FIGS. 3a and 3b show a block diagram of a control unit of an embodiment of the present invention.
Figure 3B:
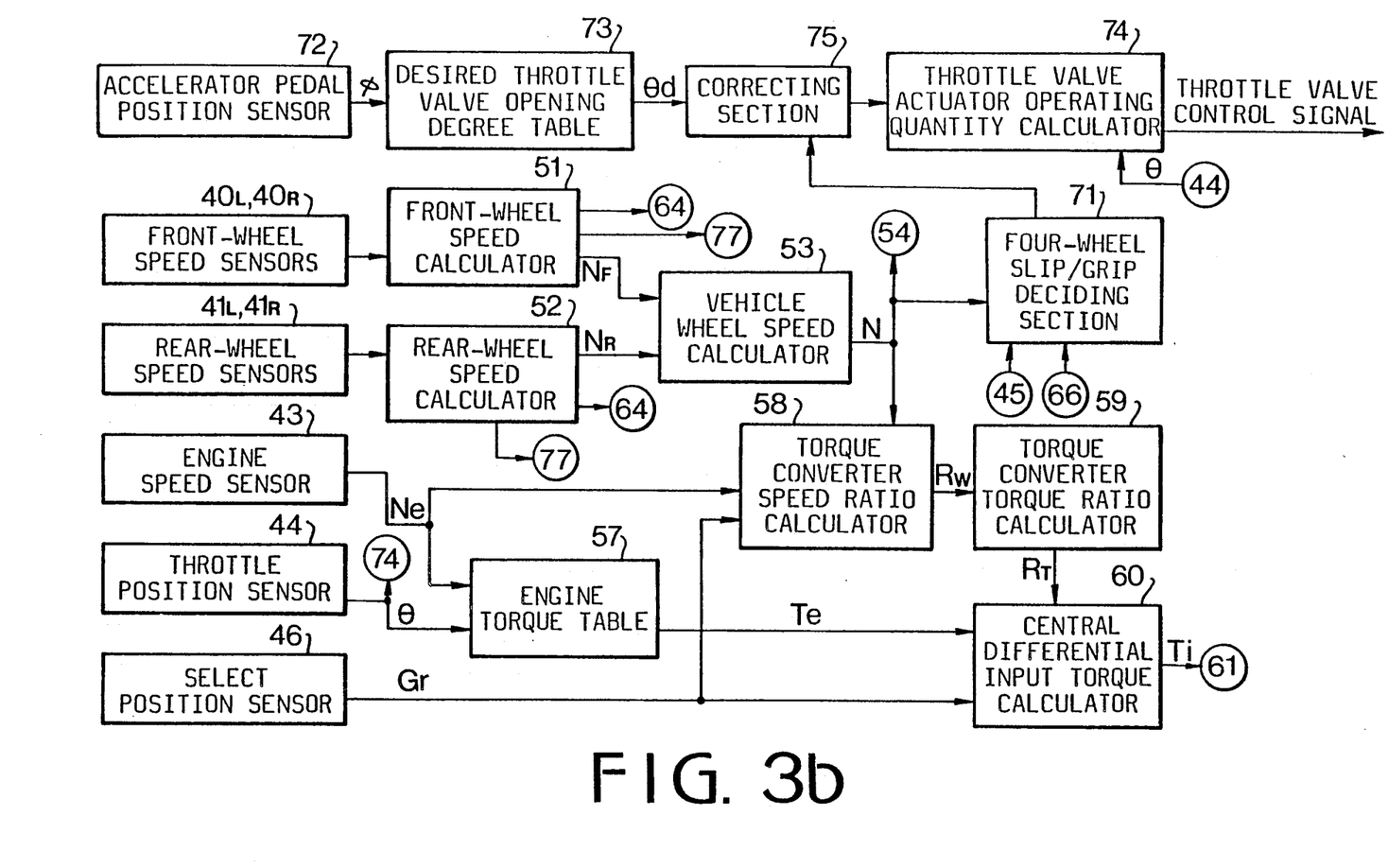

Referring to FIGS. 3a and 3b, the control unit 50 has a front wheel speed calculator 51 to which speeds $N_{FL}$ and $N_{FR}$ from the left and right front wheel sensors 40L and 40R are applied, and a rear wheel speed calculator 52 to which speeds $N_{RL}$ and $N_{RR}$ from the left and right rear wheel speed sensors 41L and 41R are applied. Front wheel speed $N_F$ and rear wheel speed $N_R$ are obtained from the following equations.

$$N_F = (N_{FL} + N_{FR})/2$$

$$N_R = (N_{RL} + N_{RR})/2$$

The speeds $N_F$ and $N_R$ are fed to a vehicle wheel speed calculator 53 where the average speed N of the four wheels is calculated as follows.

$$N = (N_F + N_R)/2$$

The speed N is applied to a vehicle speed calculator 54 where vehicle speed V is obtained from the speed N and diameter of tires of the vehicle.

Figure 4A:
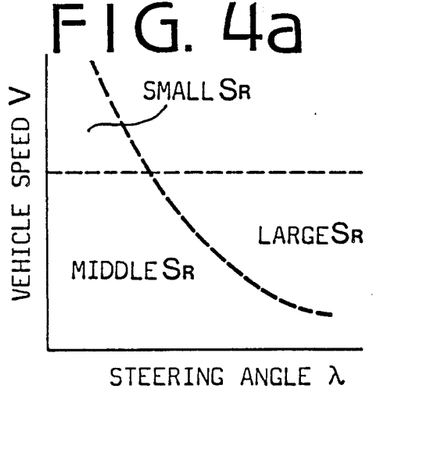
FIG. 4a is a graph showing a torque distribution ratio in accordance with the vehicle speed and steering angle.

The vehicle speed V and the steering angle $\lambda$ detected by the steering angle sensor 42 are applied to a desired torque distribution ratio table 55. The desired torque distribution ratio table 55 is stored with a plurality of torque distribution ratios $S_R$ for the rear wheels provided from a graph shown in FIG. 4a. The table provides a distribution ratio $S_R$ in accordance with the steering angle $\lambda$ and the vehicle speed V. When the vehicle is steered at a small radius in a middle speed range, the desired torque distribution ratio $S_R$ is increased so as to improve the steerability of the vehicle. To the contrary, if the vehicle is steered at a large radius at a high speed, the desired distribution ratio $S_R$ becomes small in order to ensure stability of the vehicle. In other regions, the distribution ratio is set so as to comply both with the steerability and stability. The desired distribution ratio $S_R$ is applied to an acceleration correcting section 56 to which an acceleration G of the vehicle body from the acceleration sensor 45 is applied to correct the distribution ratio in accordance with the acceleration. If the acceleration G is zero, the vehicle is in a steady state so that no correction is performed.

Figure 4B:
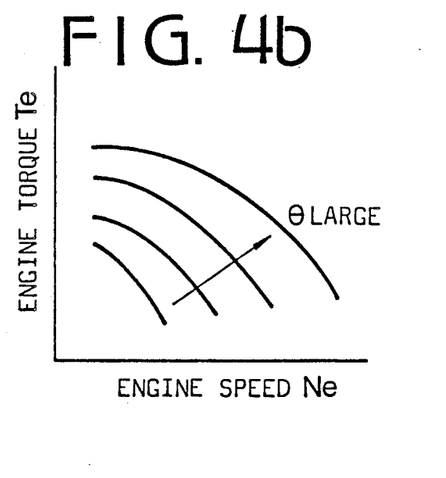
FIG. 4b is a graph showing engine torques in accordance with engine speed and throttle valve opening degree.

Engine speed Ne and throttle opening degree $\theta$ from the engine speed sensor 43 and the throttle position sensor 44 are applied to an engine torque table 57 from which engine torque Te is derived in accordance with Ne and $\lambda$ as shown in a graph of FIG. 4b. The engine speed Ne, the vehicle wheel speed N and transmission ratio Gr detected by the select position sensor 46 are applied to a torque converter speed ratio calculator 58. The calculator 58 calculates a turbine speed Nt, which is an output speed of the torque converter 2, from the vehicle wheel speed N and the transmission ratio Gr. Speed ratio Rw between the engine speed Ne which is an input speed of the torque converter 2 and the output speed Nt is $$Rw = Nt/Ne.$$

Figure 4C:
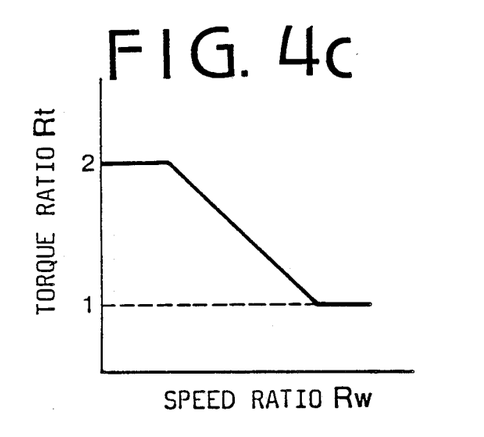
FIG. 4c is a graph showing a characteristic of torque ratio in accordance with speed ratio.

The speed ratio Rw is applied to a torque converter torque ratio calculator 59 from which a torque ratio Rt of the torque converter is derived as shown in FIG. 4c. The torque ratio Rt is applied to a central differential input torque calculator 60 to which engine torque Te and transmission ratio Gr are also applied. The input torque Ti to the central differential 20 is calculated as follows.

$$Ti = Te \cdot Rt \cdot Gr$$

The desired torque distribution ratio $S_R$ and the torque Ti are applied to a clutch pressure calculator 61. The distribution ratio $S_R$ can be expressed as below.

$$SR = T_R/(T_F + T_R) \qquad (3)$$

In accordance with the afore-described equations (1), (2) and (3), the clutch torque TC can be expressed as $$T_C = f(S_R, Ti)$$

Figure 4D:
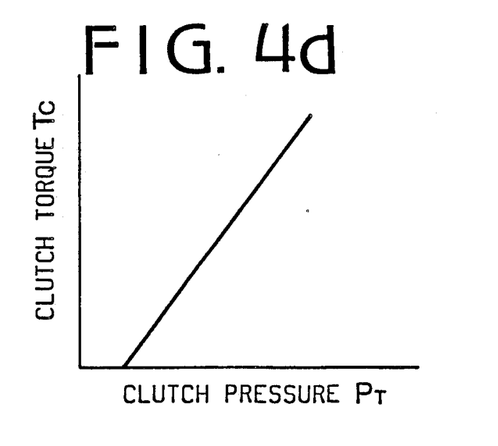
FIG. 4d is a graph showing a characteristic of clutch torque in accordance with clutch pressure.

Accordingly, the clutch torque increases with the increase of the torque distribution ratio $S_R$ and input torque Ti. The clutch pressure $P_T$ is an increasing function of the clutch torque $T_C$, depending on the number of disks in the clutch 27 and friction coefficient between the disks. Thus, the clutch pressure $P_T$ is expressed as $$P_T = g(T_C)$$

as shown in a graph of FIG. 4d. The clutch pressure $P_T$ is applied to a duty ratio setting section 62 where a duty ratio signal corresponding to the clutch pressure $P_T$ applied to the hydraulic clutch 27 is obtained.

Figure 4E:
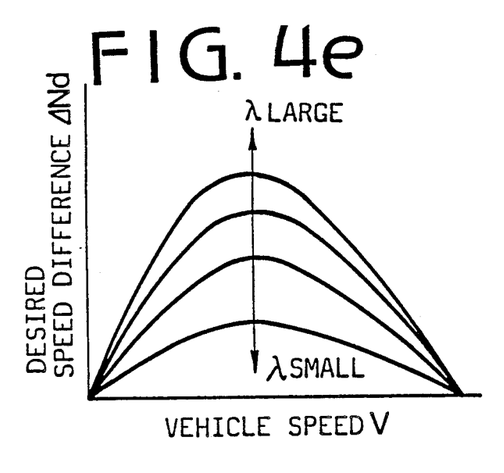
FIG. 4e is a graph showing desired speed differences between front and rear wheels in accordance with vehicle speed and steering angle in the embodiment of the present invention.

The control unit 50 further has a desired speed difference providing section 63, an actual speed difference calculator 64 and a two-wheel slip determining section 66. The desired speed difference providing section 63 provides a desired speed difference ΔNd between the front and rear wheels in dependency on the vehicle speed V and steering angle λ. As shown in a graph of FIG. 4e, the desired speed difference ΔNd increases with the increase of the steering angle λ. The difference ΔNd also gradually increases with the increase of the vehicle speed V in a low vehicle speed region, and gradually decreases with the further increase of the vehicle speed beyond a predetermined vehicle speed. When the steering angle is zero for driving the vehicle straight-ahead, the desired speed difference ΔNd is set at zero, so as to render the vehicle able to follow an optimum path without slipping. Additionally, such an optimum path varies in dependency on conditions of the road surface and engine torque. Thus, in the present embodiment, the friction coefficient μ is applied to the desired speed difference providing section 63 to correct the speed difference ΔNd, that is by decreasing the difference as the friction coefficient decreases.

The actual speed difference calculator 64 calculates a difference Δ N between front-axle speed $N_{FA}$ represented by the average front wheel speed $N_F$ and rear-axle speed $N_{RA}$ represented by average rear wheel speed $N_R$ as follows.

$$\Delta N = N_{FA} - N_{RA}$$

The desired and actual speed differences ΔNd and ΔN are applied to the two-wheel slip determining section 66 where it is determined that either the front wheels are slipping with respect to the rear wheels or the rear wheels are slipping slip relative to the rear wheels when the actual difference ΔN deviates from the desired difference. Namely when the actual speed difference ΔN is under the following conditions.

$$\Delta N > \Delta Nd + K1$$

$$\Delta N > \Delta Nd - K2$$

where K1 and K2 are constants corresponding to a dead zone for determining the slipping which is decided by the accuracy of the speed sensors, and other factors. The two-wheel slip signal from the slip determining section 66 is applied to a correcting section 67 to correct the clutch pressure in accordance with the slipping rate.

Figure 4F:
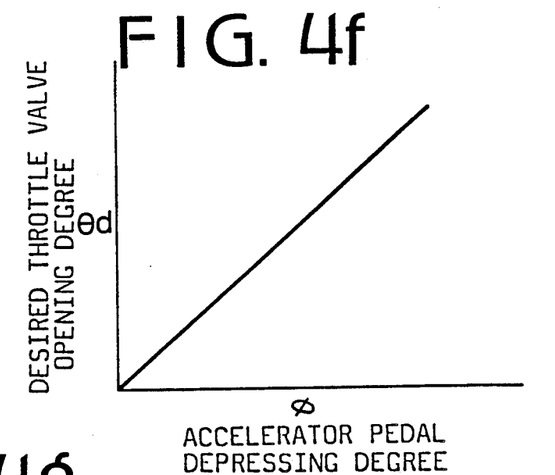
FIG. 4f is a graph showing a desired throttle valve opening degree in relation to an accelerator pedal depressing degree.

A system for controlling the traction of the engine is described hereinafter. An accelerator pedal depressing degree ϕ detected by the accelerator pedal position sensor 72 is applied to a desired throttle opening degree table 73 where a plurality of desired throttle opening degrees θd, which increase with the accelerator pedal depressing degree θ as shown in FIG. 4f, are stored. The desired throttle opening degree θd is applied through a correcting section 75 to a throttle valve actuator operating quantity calculator 74, where the actual throttle opening degree from the sensor 44 is applied. The calculator 74 produces the throttle valve control signal in dependency on a deviation of the actual throttle opening degree θ from the desired opening degree θd.

The desired throttle opening degree θd is corrected in the correcting section 75 in accordance with a signal from a four-wheel slip/grip deciding section 71, to which the output signal of the two-wheel slip deciding section 66, the vehicle wheel speed N and the acceleration G of the vehicle body are fed. The deciding section 71 determines that the four wheels of the vehicle are slipping or that the four wheels grip the road surface when the actual speed difference ΔN between front and rear axles is in a range of ΔNd−K2 and ΔNd+K1 (ΔNd−K2≦ΔN≦ΔNd+K1), which means that the two-whee slip signal does not exist. A difference Δ G between the acceleration G of the vehicle body and an acceleration $G_N$ of the vehicle wheels, which is the differential of the vehicle wheel speed N, is calculated (ΔG = $G_N$ − G). When the difference ΔG is larger than a predetermined slip reference value $\Delta G_S$ (ΔG ≦ ΔGS), it is determined that the four wheels of the vehicle are slipping ($\Delta G_S > 0$). On the other hand, when the difference ΔG is smaller than a predetermined grip reference value $\Delta G_S'$ (ΔG ≦ $\Delta G_S'$), it is determined that the four wheels resumed gripping of the road surface after the slipping ($\Delta G_S' < 0$). The four-wheel slip and grip may be determined in dependency on a difference ΔN between the vehicle wheel speed N and a vehicle body speed $N_G$ which is an integral of the acceleration G of vehicle body, predetermined slip reference value $\Delta N_S$ and predetermined grip reference value $\Delta N_S'$ in the same manner as the above described method.

When a slip signal is applied to the correcting section 75, the desired throttle opening degree θd is decreased, and when a grip signal is applied after the slipping, the original desired throttle opening degree θd is restored.

Figure 4G:
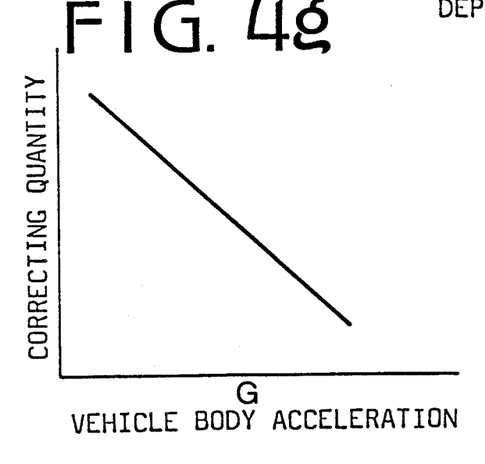
FIG. 4g is a graph showing a correcting quantity in relation to an acceleration of a vehicle body.

The correcting quantity is set in relation to the acceleration G of the vehicle body as shown in a graph of FIG. 4g. If the four-wheel slipping occurs when the acceleration G is small, assuming that the slipping rate is large on account of the low friction coefficient of the road surface, the throttle opening degree is largely decreased to reduce the traction.

When the wheels skid while the brake is actuated, an antilock brake system (ABS) operates to reduce the a braking effect, in response to output signals of the front and rear wheels speed calculators 51 and 52 and vehicle speed calculator 54. In the ABS, since the braking effect is influenced by the engine torque, controlling of the transmitted torque, that is the traction control, is not preferable. Therefore, an antilock brake signal from the ABS 77 is applied to the correction section 67 so as to render the clutch pressure $P_T$ in the clutch 27 zero. Accordingly, the torque is split in accordance with the basic torque distribution ratio dependent on the central differential 20.

When the drive range is selected, the output torque of the engine is transmitted through the torque converter 2 and the transmission 3 to the central differential 20 at which the torque is divided to the ring gear 22 and sun gear 21, for example at a ratio 60:40, in accordance with a static load of the vehicle. The divided torques are transmitted to the front and rear drive shafts 7 and 11. At the same time, the torques are transmitted to the hub 27a of the oil clutch 27 through gears 5, 6 and shaft 26 and to the drum 27b through gears 29 and 28, respectively. Since the speed of the drum 27b is reduced by the gear ratio K between gears 29 and 28, the torque is transmitted from hub 27a of higher speed side to the drum 27b of lower speed side.

During a steady driving state where the vehicle is not accelerated, that is, when the acceleration G is substantially zero, the desired torque distribution ratio $S_R$ for the rear wheels is held at a basic ratio of 40%. Therefore, the clutch pressure $P_T$ calculated at the calculator 61 is zero. Accordingly, the duty ratio of the pulses applied to the solenoid operated valve 34 is set at zero at the duty ratio setting section 62. The control pressure $P_C$ is at maximum, thereby draining the oil in the clutch 27. Therefore, clutch pressure $P_T$ in the clutch 27 becomes zero so that the clutch is disengaged so as to render the members of the torque split control device 25 idle. Accordingly, the input torque is split to the front and rear wheels 10R, 10L, 14R, 14L in accordance with the basic ratio.

If the vehicle is steered at a relatively small radius by a large steering angle while driven at a steady state at middle speed, the desired torque distribution ratio $S_R$ is increased. The control unit 50 applies corresponding pulse having a larger duty ratio, thereby draining the oil from the solenoid valve 34. Accordingly, the control pressure $P_C$ decreases, supplying a large amount of oil to the clutch 27. Consequently, a large clutch torque $T_C$ is produced in the clutch, so that a torque dependent on the clutch torque $T_C$ is transmitted from hub 27a to drum 27b. Accordingly, the torque $T_F$ to the front wheels is reduced by a torque based on the large clutch torque $T_C$. To the contrary, the torque $T_R$ to the rear wheels is greatly increased by a torque based on the clutch torque and the gear ratio K at gears 28 and 29.

On the other hand, if the vehicle speed V is low and the steering angle λ is small, the transfer torque is decreased to reduce the torque to rear wheels.

When the vehicle is accelerated, the load on the vehicle moves to the rear part of the vehicle. In accordance with the movement of the load, the torque distribution ratio $S_R$ from the table 55 is increased in the correcting section 56, so as to increase the rear torque $T_R$, even if the vehicle is driven straight. Therefore, traction is improved. If the input torque Ti becomes small, the clutch pressure $P_T$ becomes small regardless of the value of the distribution ratio SR so that tight corner braking can be prevented.

The above described control patterns are summarized as set out in the following table.

TABLE

|  | STRAIGHT-AHEAD DRIVING | CORNERING |
|---|---|---|
| STEADY STATE | BASIC DISTRIBUTION | DISTRIBUTION RATIO TO REAR WHEELS INCREASES |
| ACCELERATION | DISTRIBUTION RATIO TO REAR WHEELS INCREASES | |

Figure 5A:
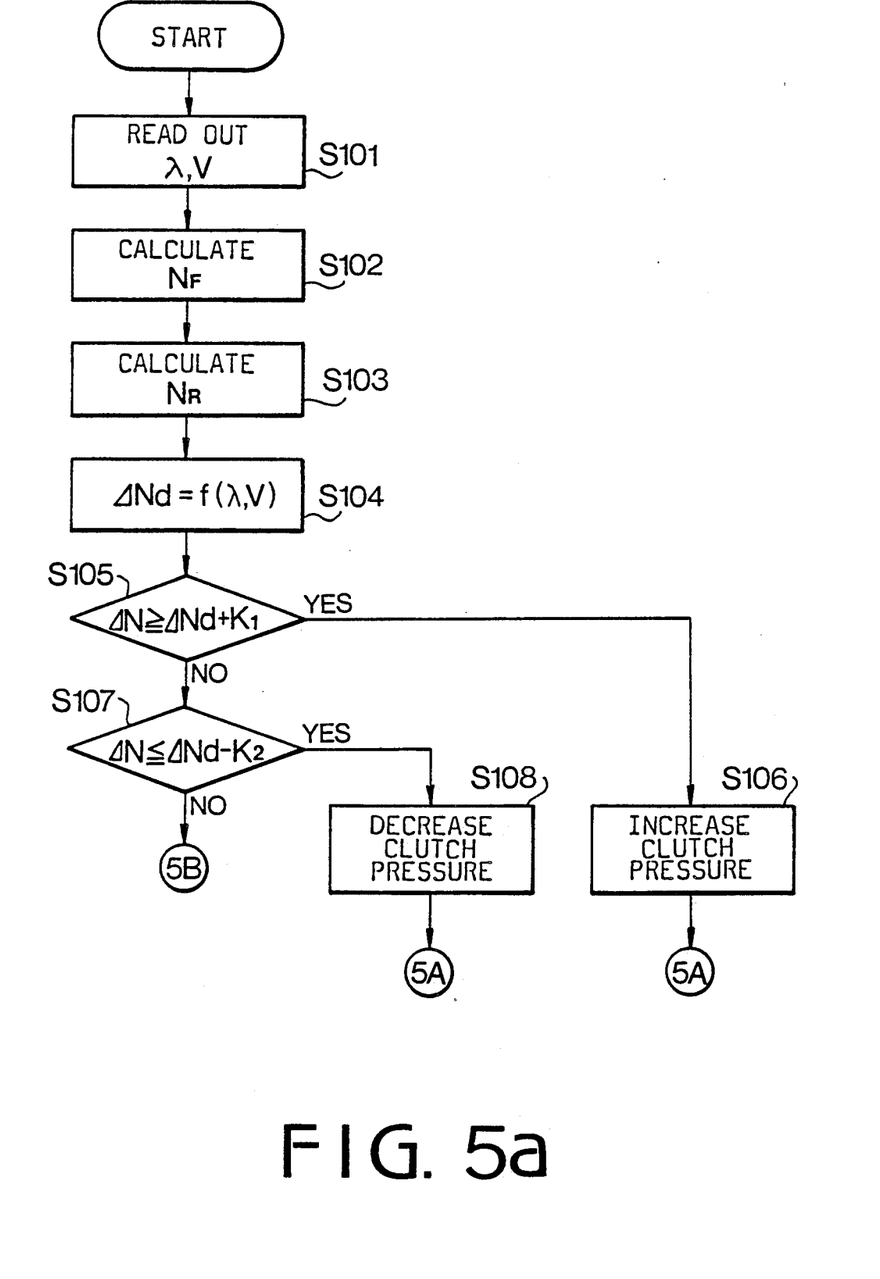
FIGS. 5a and 5b show a flowchart showing the operation of the control unit.
Figure 5B:
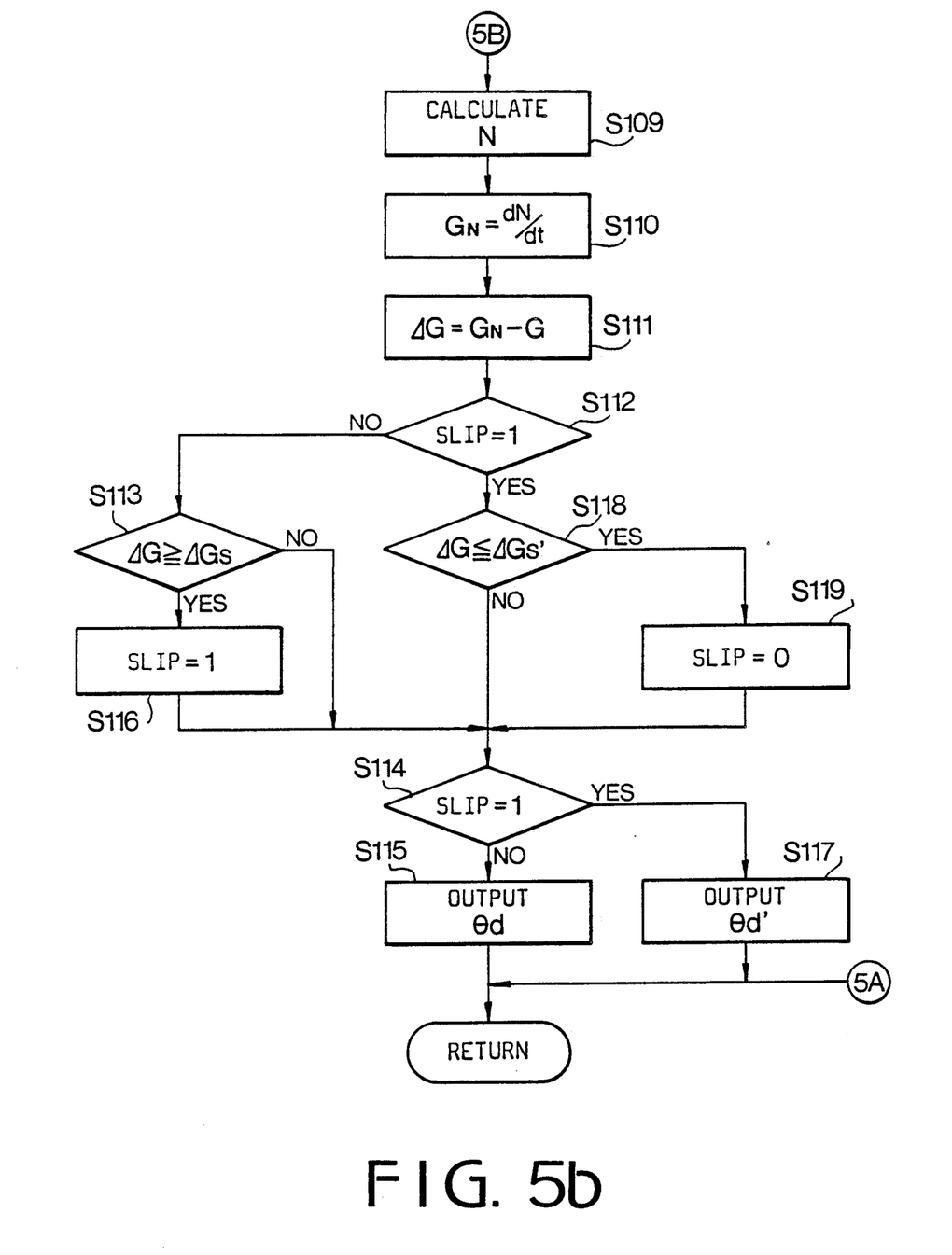

The system for preventing the two-wheel and four-wheel slipping is described hereinafter with reference to a flowchart shown in FIGS. 5a and 5b.

At a step S101, the steering angle λ and the vehicle speed V are read out. The front-wheel speed $N_F$ and rear wheel speed $N_R$ are calculated at steps S102 and S103, respectively. The desired speed difference ΔNd is derived from the table 63 dependent on the steering angle λ and vehicle speed V at a step S104. At a step S105, it is determined whether the speed difference ΔN between the front axles and rear axles is larger than ΔNd+K1. If the difference ΔN is larger, meaning that only the front wheels are slipping, the program proceeds to a step S106, where clutch pressure $P_T$ applied to the clutch 27 is increased so as to increase the torque distribution ratio for rear wheels. Accordingly, the differential operation of the central differential 20 is limited by the clutch 27. When the difference ΔN is equal or smaller than ΔNd+K1, the program proceeds to a step S107 where it is determined whether the difference ΔN is smaller than ΔNd−K2. When the difference 66 N is smaller, the rear wheels are slipping so that it can be assumed that the clutch 27 generates a large clutch torque, thereby limiting the differential operation of the central differential 20. Therefore, the clutch pressure $P_T$ is decreased to increase the torque to the front wheels at a step S108. Thus, the actual difference ΔN is converged to the desired difference ΔNd by the feedback control. Since the differential is not locked, the skidding is prevented while keeping steerability.

When the front wheels with respect to the front wheels or the rear wheels slip relative to the front wheels while the vehicle is driven straight ahead, the actual difference ΔN always becomes much larger than the desired difference (|ΔN|>|ΔNd|). In the present embodiment, the vehicle can be got out of a stuck condition or be driven by increasing the clutch pressure to limit the differential operation. Furthermore, on slippery roads, the difference ΔNd is decreased dependent on the friction coefficient μ so that the operation of the central differential 20 is limited, thereby preventing slipping.

When the difference is between ΔNd+K1 and ΔNd−K2 (ΔNd −K2≦ΔN≦ΔNd+K1), the traction control for preventing four-wheel slip is carried out. At a step S109, vehicle wheel speed N is calculated in dependency on the front wheel speed $N_F$ and the rear wheel speed $N_R$, and at a step S110, vehicle wheel acceleration $G_N$ for example, is calculated. The difference $\Delta G$ between the wheel acceleration $G_N$ and vehicle body acceleration G is calculated at a step S111. At a step S112, it is determined whether a flag indicating the four-wheel slip was set at the last program. If the flag is not set, the difference $\Delta G$ is compared with the predetermined slip value $\Delta G_S$ at a step S113. When the difference $\Delta G$ is smaller than the value $\Delta G_S$, determining that the vehicle is steadily driven, the program goes to a step S114, where it is again determined if the flag is set or not. Since the flag is not set, the program proceeds to a step S115 where the desired throttle valve opening degree $\theta d$ derived from the table 73 is fed to the actuator operating quantity calculator 74 without any correction. Accordingly, a control signal representing the operating quantity dependent on the desired degree $\theta d$ and actual degree $\theta$ is applied to the actuator 16 of the throttle valve 15 so that the throttle valve is adjusted to the desired opening degree $\theta d$.

When the acceleration $G_N$ of the vehicle wheels is much larger than the acceleration G of the vehicle body so that the difference $\Delta G$ is larger than the slip value $\Delta G_s$, it is determined that the four wheels of the vehicle are slipping. Accordingly, the flag is set at a step S116. Determining that the flag is set at the step S114, the program goes to a step S117, where the desired opening degree $\theta d$ is reduced in the correcting section 75. The actuator operating quantity is calculated in dependency on the corrected desired opening degree $\theta d'$ and the corresponding signal is applied to the actuator 16. Consequently, the opening degree of the throttle valve 15 is decreased so as to decrease the torque of the engine 1, thereby reducing the vehicle wheel speed N and vehicle wheel acceleration $G_N$.

When the flag is detected at the step S112, the program goes to a step S118. Since the vehicle wheel acceleration $G_N$ is reduced at the previous program, the difference $\Delta G$ between the vehicle wheel acceleration $G_N$ and the vehicle body acceleration G is reduced. The difference $\Delta G$ is now compared with the predetermined grip value $\Delta G_S'$. When the difference is larger, the four wheels are slipping so that the program proceeds to the step S117 from No from step S118 through the step S114, repeating the afore-described operation.

When the difference $\Delta G$ is smaller than the grip value $\Delta G_S'$, it is determined that the four wheels grip the road surface. The flag is reset at a step S119. Accordingly, the program goes to the step S115 through the step S114, thereby terminating the correction in the correcting section 75. Thus, the throttle valve is controlled at the desired degree $\theta d$.

When the ABS is operated at the actuation of the brake, the antilock brake signal is applied to the correcting section 67 so that the clutch pressure $P_T$ in the clutch 27 becomes zero. Therefore, the basic distribution ratio is resumed so as to effectively brake the vehicle by ABS.

The present invention may be modified to reduce the traction by braking the engine or controlling an ignition timing, thereby decreasing the engine torque.

In accordance with the present invention, the four-wheel slip or spin, which is a state of emergency where the slipping cannot be prevented by controlling the torque split to front and rear wheels, can be accurately determined in distinction from the two-wheel slip. Accordingly, the traction of the vehicle is decreased only at the four-wheel slip. Thus, each of the four wheels is equally and effectively prevented from slipping. In addition, the control of the torque distribution ratio is cancelled when the ABS is operated so as to reliably control the system.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a power transmitting system for a four-wheel drive vehicle having a central differential for splitting torque of an engine at a predetermined ratio, power trains for transmitting the split torques from output members of the central differential to front and rear wheels respectively of the vehicle, a throttle actuator for changing an opening degree of a throttle valve of the engine, and a torque split control device including a clutch provided between the output members of the central differential for changing torque distribution ratio of the torques transmitted to the front and rear wheels, the improvement in the system comprising:

front-wheel speed sensors for detecting right and left front-wheel speeds and for producing right and left front-wheel speed signals;

rear-wheel speed sensors for detecting right and left rear-wheel speeds and for producing right and left rear-wheel speed signals;

first calculator means responsive to the right and left front-wheel and rear-wheel speed signals for producing a front-axle speed signal and a rear-axle speed signal;

second calculator means responsive to the right and left front-wheel and rear-wheel speed signals for producing a vehicle speed signal;

a steering angle sensor for producing a steering angle signal;

a vehicle body acceleration sensor for producing a vehicle body acceleration signal;

deciding means responsive to the speed signal and the steering angle signal for determining a desired torque distribution ratio and for producing a distribution ratio signal representing the desired torque distribution for controlling the clutch of the split control device;

an antilock brake system responsive to the front-axle and rear-axle speed signals and the vehicle speed signal for producing an antilock brake signal for reducing braking effect of the vehicle;

two-wheel slip detecting means responsive to the front-axle speed signal and the rear-axle speed signal for producing a two-wheel slip signal when the front wheels are slipping with respect to the rear wheels or the rear wheels are slipping with respect to the front wheels;

four-wheel slip detecting means responsive to the front-axle and rear-axle speed signals and the vehicle body acceleration signal for producing a four-wheel slip signal only at nonexistence of the two-wheel slip signal;

correcting means responsive to the two-wheel slip signal for changing engaging of the clutch so as to reduce the slip torque distribution to the slipping wheels;

said correcting means being responsive to the antilock brake signal for reducing clutch torque; and actuating means being responsive to the four-wheel slip signal for initially reducing traction.

2. The system according to claim 1 wherein the clutch is an oil hydraulic clutch having opposite disks which operates to transmit torque by difference between speeds of opposite disks and by difference of pressure supplying to the clutch.

3. The system according to claim 1 wherein the central differential is a planetary gear.

4. The system according to claim 1, wherein
said correcting means is responsive to the antilock brake signal for reducing clutch torque when wheels skid while a brake of the vehicle is actuated.

5. The system according to claim 1, wherein
said correcting means is responsive to the antilock brake signal for reducing clutch torque to zero.

6. The system according to claim 4, wherein
said correcting means is responsive to the antilock brake signal for reducing clutch torque to zero.

7. The system according to claim 1, wherein
the four-wheel slip detecting means produces the four-wheel slip signal in dependency on the difference between the vehicle body acceleration signal and another acceleration signal representing acceleration of the vehicle wheels calculated based on the front-axle and rear-axle speed signals.

8. The system according to claim 1, wherein
said actuating means is responsive to the four-wheel slip signal from reducing the traction by actuating the throttle actuator so as to reduce the opening degree of the throttle valve.

9. The system according to claim 1, wherein
the four-wheel slip detecting means produces the four-wheel slip signal in dependency on the difference between a vehicle wheel speed signal calculated from the front-axle and rear-axle speed signals and a vehicle body speed signal calculated as an integral of the vehicle body acceleration signal.

10. The system according to claim 9, wherein
the vehicle wheel speed signal is an average of the front-axle and rear-axle speed signals.

11. the system according to claim 7, wherein
said another acceleration signal represents the derivative of the average of the front-axle and rear-axle speed signals.

12. In a power transmitting system for a four-wheel drive vehicle having a central differential for splitting torque of an engine at a predetermined ratio, power trains for transmitting the split torques from output members of the central differential to front and rear wheels respectively of the vehicle, a throttle actuator for changing opening degree of a throttle valve of the engine, and a torque split control device including a clutch provided between the output members of the central differential for changing torque distribution ratio of the torques transmitted to the front and rear wheels, the improvement in the system comprising:
front-wheel speed sensors for detecting right and left front-wheel speeds and for producing right and left front-wheel speed signals;
rear-wheel speed sensors for detecting right and left rear-wheel speeds and for producing right and left rear-wheel speeds signals;
first calculator means responsive to the right and left front-wheel and rear-wheel speed signals for producing a front-axle speed signal and a rear-axle speed signal;
second calculator means responsive to the right and left front-wheel and rear-wheel speed signals for producing a vehicle speed signals;
a steering angle sensor for producing a steering angle signal;
a vehicle body acceleration sensor for producing a vehicle body acceleration signal;
deciding means responsive to the vehicle speed signal and the steering angle signal for determining a desired torque distribution ratio and for producing a distribution ratio signal representing the desired torque distribution ratio for controlling the clutch of the split control device;
an antilock brake system responsive to the front-axle and rear-axle speed signals and the vehicle speed signal for producing an antilock brake signal for reducing braking effect of the vehicle;
two-wheel slip detecting means responsive to the front-axle speed signal and the rear-axle speed signal for producing a two-wheel slip signal when the front wheels are slipping with respect to the rear wheels or when the rear wheels are slipping with respect to the front wheels;
four-wheel slip detecting means responsive to the front-axle and rear-axle speed signals and the vehicle body acceleration signal for producing a four-wheel slip signal when the four wheels are slipping;
correcting means responsive to the two-wheel slip signal for changing engaging of the clutch so as to reduce the split torque distribution to the slipping wheels;
said correcting means is responsive to the antilock brake signal for reducing clutch torque; and
actuating means responsive to the four-wheel slip signal for reducing traction by braking the engine to decrease engine toque.

13. In a power transmitting system for a four-wheel derive vehicle having a central differential for splitting torque of an engine at a predetermined ratio, power trains for transmitting the split torques from output members of the central differential to front and rear wheels respectively of the vehicle, a throttle actuator for changing opening degree of a throttle valve of the engine, and a torque split control device including a clutch provided between the output members o the central differential for changing torque distribution ratio of the torques transmitted to the front and rear wheels, the improvement in the system comprising:
front-wheel speed sensors for detecting right and left front-wheel speeds and for producing right and left front-wheel speed signals;
rear-wheel speed sensors for detecting right and left rear-wheel speeds and for producing right and left rear-wheel speed signals;
first calculator means responsive to the right and left front-wheel and rear-wheel speed signals for producing a front-axle speed signal and a rear-axle speed signal;
second calculator means responsive to the right and left front-wheel and rear-wheel speed signals for producing a vehicle speed signal;
a steering angle sensor for producing a steering angle signal;
a vehicle body acceleration sensor for producing a vehicle body acceleration signal;
deciding means responsive to the vehicle speed signal and the steering angle signal for determining a desired torque distribution ratio and for producing a distribution ratio signal representing the desired torque distribution ratio for controlling the clutch of the split control device;

an antilock brake system responsive to the front-axle and rear-axle speed signals and the vehicle speed signal for producing an antilock brake signal for reducing braking effect of the vehicle;

two-wheel slip detecting means responsive to the front-axle speed signal and the rear-axle speed signal for producing a two-wheel slip signal when the front wheels are slipping with respect to the rear wheels or when the rear wheels are slipping with respect to the front wheels;

four-wheel slip detecting means responsive to the front-axle and rear-axle speed signals and the vehicle body acceleration signal for producing a four-wheel slip signal when the four wheels are slipping;

correcting means responsive to the two-wheel slip signal for changing engaging of the clutch so as to reduce the split torque distribution to the slipping wheels;

said correcting means is responsive to the antilock brake signal for reducing clutch torque; and actuating means responsive to the four-wheel slip signal for reducing traction by controlling ignition timing of the engine to decrease engine torque.

* * * * *